UNITED STATES PATENT OFFICE

HARRY C. MOUGEY, OF DETROIT, MICHIGAN, ASSIGNOR TO GENERAL MOTORS RESEARCH CORPORATION, OF DETROIT, MICHIGAN, A CORPORATION OF DELAWARE

METAL CLEANING COMPOSITION

No Drawing.   Application filed August 1, 1929.  Serial No. 382,846.

The invention relates to compositions for cleaning metal surfaces, particularly the surfaces of articles formed of iron or steel or alloys thereof, herein termed ferrous metals.

It is common practice to treat the surfaces of such articles, for example, metal portions of automobile bodies, with liquid cleaning compositions designed to prepare the surface for the reception of finishes such as enamels, paints or lacquers. Important characteristics of these cleaning compositions are that they shall be capable of removing rust and also oil or grease. For the purpose of removing rust it is customary to include as a constituent of the composition some rust removing acid such as orthophosphoric acid. In order to remove oily materials, provided both functions are to be performed by a single mixture, it is necessary to include a constituent which is a solvent for oils. This solvent must also be miscible in the desired proportions with the aqueous solution of the acid employed, in other words, it must be a common solvent for both water and oil.

Another desirable property of the solvent is a relatively high boiling point, so that the composition may be applied while hot without undue evaporation and resultant waste. This boiling point should preferably be not lower than approximately that of water. The solvent should also, of course, be stable in admixture with the acid employed. For economic reasons, also, the solvent should be one which is readily available in large quantities and at relatively low cost and it should be of such character as not to be objectionable to the workmen who are required to handle or apply it.

A considerable number of the more recently commercialized organic compounds possess these desirable properties to a greater or less degree. Among those which I have found especially suitable are the poly-glycols, such as di-, tri-, and tetra-ethylene glycol, and their ethers, especially the ethyl and butyl carbitols (ethers of di-ethylene glycol). The methyl, ethyl, and propyl ethers of propylene glycol are also suitable. Some of the esters of the glycols, for example, the acetates of glycol and of di-ethylene glycol and of the ethyl ethers of ethylene glycol, may be employed where their acid properties are not objectionable. Of these esters the preferred examples are ethylene glycol mono-acetate, di-ethylene glycol mono-acetate, and the acetates of the methyl and ethyl ethers of ethylene glycol. Some other bodies related to the glycols are also of especial utility for this purpose, 1, 4-di-oxan being one of the most valuable.

Of the substances mentioned di-ethylene glycol is especially desirable both because of its properties and because of its relatively low cost. Carbitol (the mono-ethyl ether of di-ethylene glycol) and di-oxan are also highly desirable but are somewhat more expensive at present. The boiling points of these three bodies are, respectively 245° C., 180-190° C., and 101° C. The others, however, are so suitable that a choice between them would depend to a considerable extent upon their commercial availability. All of the above named substances may be grouped as water-soluble oil solvents of the glycol type and will be hereinafter so designated. It is not intended to include in the present invention the ethers of ethylene glycol but water-soluble, oil-soluble esters of such ethers are included. By the use of the terms "water-soluble" and "oil soluble" it is not intended to limit the invention to those substances which mix with water and oil in all proportions. The substance is deemed water soluble for the purposes of this invention if it is sufficiently soluble to form a solution in the concentration in which it is desired to use the material. Similarly it is "oil soluble" if it is capable of attacking oil sufficiently to cause the mixture to wet an oily surface.

Certain other esters which are both water soluble and oil soluble and have boiling points higher than that of water are also especially suitable in view of their powerful solvent action and their low cost. Ethyl lactate and ethyl oxy-butyrate are the preferred examples. The boiling point of ethyl lactate is about 152° C., that of ethyl oxybutyrate is about 167° C.

A cleaning composition for treatment of sheet steel preliminary to painting or enameling may be made up as follows:

Phosphoric acid (85%) _____ 1 part
Water soluble oil solvent _____ ¼ to 2 parts

In order to reduce cost or to vary volatility it may be desirable to add to the composition some other solvents such as alcohols or ketones with which the more powerful solvents enumerated are readily miscible. A suitable cleaning compound of this type may be made up as follows:

Phosphoric acid (85%) _____ 1 part
Ethyl alcohol (denatured) ____ 1 part
Water soluble oil solvent _____ ¼ to 2 parts These mixtures may be diluted with water to the extent desired for convenience and effectiveness in application and to further reduce cost.

In the use of the composition it may be applied by spraying, or by a brush or cloth, to the surface to be treated. After remaining on the surface for a short time the composition is removed, as by washing with water, and the surface dried, leaving it clean and ready for application of finishing materials.

I claim:

1. A composition for cleaning surfaces of ferrous metal comprising phosphoric acid, water and di-ethylene glycol.

2. A composition for cleaning surfaces of ferrous metal comprising an acid adapted to remove rust, such as phosphoric acid, and a water-soluble oil solvent selected from the group of substances consisting of di-, tri- and tetra-ethylene glycol and their ethers, the methyl, ethyl and propyl ethers of propylene glycol, the acetates of glycol and of di-ethylene glycol and of the ethyl ethers of ethylene glycol.

3. The process of cleaning a ferrous metal surface comprising treating the surface with an admixture of phosphoric acid, water and a water-soluble oil solvent selected from the group of substances consisting of di-, tri- and tetra-ethylene glycol and their ethers, the methyl, ethyl and propyl ethers of propylene glycol, the acetates of glycol and of di-ethylene glycol and of the ethyl ethers of ethylene glycol.

4. A process as set forth in claim 3, the oil solvent being an ether of a polyglycol.

In testimony whereof I affix my signature.

HARRY C. MOUGEY.